(12) United States Patent
Dultz et al.

(10) Patent No.: US 6,430,345 B1
(45) Date of Patent: Aug. 6, 2002

(54) METHOD AND DEVICE FOR PRODUCING A CHOICE OF EITHER SINGLE PHOTONS OR PAIRS OF PHOTONS IN AN OPTICAL CHANNEL

(75) Inventors: Wolfgang Dultz; Gisela Dultz, both of Frankfurt am Main; Helmar A. Becker, Hanau; Heidrun Schmitzer, Regensburg, all of (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 09/463,685

(22) Filed: Sep. 27, 2000

(30) Foreign Application Priority Data

May 28, 1998 (DE) ........................................ 198 23 849

(51) Int. Cl.[7] .............................................. G02B 6/00
(52) U.S. Cl. ...................................................... 385/122
(58) Field of Search ........................................ 385/122

(56) References Cited

U.S. PATENT DOCUMENTS 5,307,410 A * 4/1994 Bennett ........................ 380/21

FOREIGN PATENT DOCUMENTS

DE          196 41 754          4/1998

OTHER PUBLICATIONS

Kaoru et al., "Quantum communication with a 2–bit message coding for each transmitted photon," Proceedings of the 1997 Pacific RIM Conference on Lasers and Electro–Optics, Cleo/Pacific RIM; Chiba, JPN, Jul. 14–18 1997, pp. 79–80.

Michler et al., "Interferometric Bell–state analysis," Physical Review A (Atomic, Molecular, and Optical Physics), Mar. 1996, APS through AIP, USA, Bd. 53, Nr. 3, pp. R1209–R1212.

Di Giuseppe et al., "Entangled non–local quantum interferometry," Fundamental Problems in Quantum Theory Workshop, Baltimore, Md., USA, Aug. 4–7, 1997, Bd. 46, Nr. 6–8, pp. 643–661.

Shih et al., "Why to–photon not two photons?," Fundamental Problems in Quantum Theory Workshop, Baltimore, Md., USA, Bd. 46, Nr. 6–8, pp. 627–641.

H. Paul, Non–linear Optiks, vol. 2, p. 94 ff, Berlin 1973.

* cited by examiner

Primary Examiner—Scott J. Sugarman
Assistant Examiner—Mohammed Hasan
(74) Attorney, Agent, or Firm—Kenyon & Kenyon

(57) ABSTRACT

A method and device for generating a choice of individual photons or photon pairs in an optical channel. The generation of this choice involves generating a two-photon state corresponding to a photon pair and spatially separating the photon pair while preserving the quantum-mechanical correlation, in the event the photons are emitted in a collinear manner. One photon is coupled into one optical channel each, the one channel containing an interferometer with variable optical path-length difference $\delta 1_F - \delta 1_S$, and the other channel including an optical delay section having the optical length $\delta 1$. The channels are spatially reunited through a beam splitter, and an adjustment of the quantities $\delta 1_F$, $\delta 1_S$, and $\delta 1$ occurs in such a way that the probability K for coincidences between the outputs of the beam splitter is a choice of approximately K=0 or approximately K=1, or approximately a predetermined intermediate value, with K=0 corresponding to a photon pair in one of the output channels of the beam splitter, and K=1 corresponding to two individual photons in both output channels of the beam splitter. With this choice generation, an optical separating filter or gate can be implemented for a choice of one-photon or two-photon states, which is usable in quantum cryptography and as a basic element of a quantum-optical computing machine.

24 Claims, 3 Drawing Sheets

Type I

Type II

METHOD AND DEVICE FOR PRODUCING A CHOICE OF EITHER SINGLE PHOTONS OR PAIRS OF PHOTONS IN AN OPTICAL CHANNEL

BACKGROUND INFORMATION

The present invention relates to a method for generating a choice of individual photons or photon pairs in an optical channel. The invention furthermore relates to a device for implementing the method, the device being usable in particular as a controllable light source for one-photon or two-photon states and/or as a controllable separating filter or controllable gate for quantum states. The invention also relates to a network composed of a plurality of such devices.

BACKGROUND INFORMATION

The appearance of parametric fluorescence occurs in optically non-linear crystals. Under certain circumstances, a single energy quantum (photon) of an intensive optical pumping light source, usually a laser light source, disintegrates with a certain probability into two energy quanta or photons of approximately half the energy (H. Paul, *Nonlinear Optiks*, vol. 2, page 94 ff, Berlin 1973). In the case of monochromatic or narrow-band excitation, the spectral distribution of the fluorescence photons is not necessarily narrow-band as well. However, because of the conservation of energy, the sum of the energies of the two fluorescence photons must be equal to the energy of the excitation photon. The same holds true for the conservation of momentum. Therefore, the parametric fluorescence only occurs when working with specific excitation geometries, i.e., given a specific alignment of the pump beam relative to the optical axes of the non-linear crystal and given specific adapted refractive indices. The result is that, depending upon the excitation geometry, the fluorescent light is emitted with two different main frequencies, i.e. wavelengths, into defined space directions relative to the direction of propagation of the pump beam. The two fluorescence photons are emitted virtually simultaneously, i.e., within a time of approximately 10. femtoseconds, and into the same or different space directions depending on the type of non-linear crystal and the excitation geometry. Their polarization direction is established in the same way. The physical properties of the two photons of the parametric fluorescence are linked to one another by a number of secondary conditions; quantum mechanically, they are in an entangled state. The entangled photons are a single state from the standpoint of quantum mechanics, in which two photons remain inseparable, it being possible to make precise statements about the physical properties of one photon using measurements on the other respective photon. Such two-photon states are of technical importance as the starting state for quantum cryptography, the optical random-sequence generator or for the quantum computer.

At present, only classical methods are known for separating the photons of a swarm from one another and coupling into different optical channels, or else jointly into a single optical channel such as a glass fiber. A familiar classical possibility for separating a plurality of photons and coupling into two different channels is, first of all, the customary beam splitter, a partially mirrored glass plate in which the mirror coating is semitransparent for the wavelength utilized, or contains small holes. The partial mirroring can also be effected by vapor-deposited thin layers. These beam splitters usually stand at an angle a in the beam path, so that a portion of the light falling on the beam splitter is deflected from the original beam direction. Another possibility for coupling out a portion of the photons of a swarm is the use of a polarizing beam splitter. Its properties are based on the principle of reflection at dielectric layers or crystal-optical prisms such as the Nicol prism.

In the event the individual photons are coherent among themselves, interference methods are also available for the beam splitting. Here, the best-known are the Michelson interferometer which transmits the constructively interfering photons and reflects the destructively interfering photons, as well as the Mach-Zehnder interferometer which sorts constructively and destructively interfering photons into two different output channels. The diffraction grating also belongs to the beam splitters operating interferometrically.

One characteristic of all these beam splitters is that the distribution of the individual photons at the beam splitter into the individual output channels can only be predicted with regard to their distribution probability. A photon pair is separated at a 1:1 dividing beam splitter with the probability of ½, regardless of whether it is a question of two differentiable or two non-differentiable photons. However, it is impossible to make an exact statement as to whether a currently existing photon pair is actually separated or remains together. Therefore, the controlled transition from a two-photon state to two individual photons is not possible at present. However, the controlled generation of individual photons or photon pairs in an optical channel is important in the improvement of quantum cryptography methods, in metrology and in the development of a quantum computer.

SUMMARY OF THE INVENTION

Therefore, an object of the present invention is to specify a method for generating a choice of individual photons or photon pairs in an optical channel. The intention is also to provide a device which, while carrying out the method, can be used as a controllable light source for one-photon and two-photon states in quantum cryptography and in metrology, and as a controllable separating filter or gate for quantum states in communications networks and computing networks.

DISCLOSURE OF THE INVENTION AND ITS ADVANTAGES

The objective is achieved in a method having the following steps:

In the first method step, a two-photon state is generated, thus a pair of quantum-mechanically correlated photons which are in an entangled state. The photon pair is preferably generated in known manner by parametric fluorescence, using an optically non-linear crystal in suitable excitation geometry, a laser preferably being used as the pumping light source. Depending on the excitation geometry and type of the non-linear crystal, the fluorescence photons leave the crystal in the same or different directions at a defined angle with respect to the direction of the exciting beam, the fluorescence photons being polarized either identically or in an orthogonally linear manner between themselves. If the frequency of the pump light is $2\omega_0$, the individual photons of the photon pair have the frequencies $\omega_1$ and $\omega_2$, respectively, whereby $\omega_1+\omega_2=2\omega_0$.

In the next step, if the photons are emitted in a collinear manner, the photon pair is separated spatially, while retaining the quantum-mechanical correlation. This is done, for example, based on the polarization of the fluorescence photons, provided this is different, or based on the wavelength, for example, with the aid of a wavelength-selective mirror.

In the next step, in each case one photon is coupled into each optical channel. One of the channels contains a dual-beam or multi-beam interferometer with a variable optical path-length difference $\delta 1_F - \delta 1_S$; the other channel contains an optical delay section having the optical length $\delta 1$. Both channels are reunited again through a beam splitter. The optical channels have the same basic length, understood by this being the optical distance of the location at which the photons of the photon pair are spatially separated, to the beam divider, i.e. to the detectors when passing through the respective beam-component paths; in the case of the beam path with interferometer, the length determined via the interferometer arms. The optical paths covered in the interferometer and in the optical delay section, respectively, must be taken into account when determining the basic length.

The interferometer utilized in one of the optical channels is a two-beam interferometer such as a Mach-Zehnder or a Michelson interferometer, or a multi-beam interferometer such as a Fabry-Perot interferometer, or an Echelon. In this context, it is essential that the optical path difference $\delta 1_F - \delta 1_S$ be adjustable over at least one half of an average wavelength $\lambda$ of the fluorescence photons. In addition, the interferometer can be a linearly birefringent crystal plate, particularly a quartz plate, whose optical path difference is enlarged by an additional compensator, such that the path difference can be adjusted by more than one half wavelength $\lambda_1$ of those photons which are passing through the interferometer.

The optical delay section arranged in the other channel is preferably variable in the same way as the optical path-length difference in the interferometer. The optical delay section is preferably implemented by an optical "trombone slide" or by an electro-optical element whose refractive index is variable, making it possible to induce a variable phase difference. Furthermore, the indicated delay section can also be composed of a delay section of fixed length and an adjustment element which is able to introduce a variable phase difference corresponding approximately to one half of an average wavelength. However, the optical delay section does not necessarily have to be variable.

In the next method step, variables $\delta 1_F$, $\delta 1_S$ and $\delta 1$ are adjusted such that the probability K for coincidences between the outputs of the beam splitter is a choice of approximately K=0 or K=1, or approximately a predetermined intermediate value. Probability K is proportional to the coincidence rate which can easily be determined by arranging one detector at each output of the beam splitter and determining the coincidence rate between both outputs in known manner by evaluating the counter totals. A coincidence probability of zero corresponds to the case when both photons of the originally generated photon pair are emitted in a shared output channel of the beam splitter, thus are emitted in a collinear manner. In this context, it is uncertain which of the two output channels the photon pair takes. The probability for a specific channel is in each case 50%. On the other hand, a maximum coincidence rate, corresponding to K≈1, is obtained for the case when both photons arrive in different output channels of the beam splitter, and thus there is only one photon per output channel.

One or more mechanical and/or electro-optical adjustment elements, which preferably can be controlled remotely, are provided for changing optical path lengths $\delta 1_F$, $\delta 1_S$ and/or $\delta 1$. For example, the mechanical adjustment elements are mirrors which are displaceable by a motor. However, electronically controllable liquid-crystal cells and/or electro-optical crystal modulators are advantageous, especially for adjusting the phase in the interferometer. The phase is adjusted with liquid crystals in microseconds, even in nanoseconds with the aid of electro-optical crystal modulators. A rapid and precise adjustment of the phase between two predetermined values is particularly interesting for the case when the intention is to switch over quickly between one or two photons in the output channel.

Preferably the optical path-length difference in the interferometer ($\delta 1_F - \delta 1_S$) is so adjusted that it amounts to an integral multiple of the half average wavelength $\lambda_0$ of the photons of the photon pair, thus $|\delta 1_F - \delta 1_S| = n/2 \, \lambda_0$, where n=0, 1, 2 ... At the same time, optical length $\delta 1$ of the delay section is adjusted to the average path difference ½ ($\delta 1_F + \delta 1_S$) of the interferometer. Only photon pairs or individual photons are generated in the output channel, depending upon whether the optical path-length difference in the interferometer is an even-numbered or odd-numbered multiple of half wavelength $\lambda_0$. The transition from n to n±1 corresponds to the transition from K≈0 to K≈1, or vice versa. Since the adjustment of the device for non-linear crystals of type I and II, respectively, is somewhat different from one another, the setting of optical lengths $\delta 1_F$, $\delta 1_S$ and $\delta 1$ is preferably checked experimentally, by measuring the coincidence rate.

The device can also be adjusted completely experimentally by determining the probability K for coincidences between the outputs of the beam splitter as a function of variables $\delta 1_F$, $\delta 1_S$ and/or $\delta 1$. In so doing, the settings of the optical lengths resulting in K≈0 and/or K≈1 and/or a predetermined intermediate value are recorded in each case, so that it is possible to switch over between individual photons and photon pairs in the output channel by switching over between recorded values for the corresponding lengths, i.e. between the corresponding settings of the adjustment elements.

DETAILED DESCRIPTION

Figure 1A:
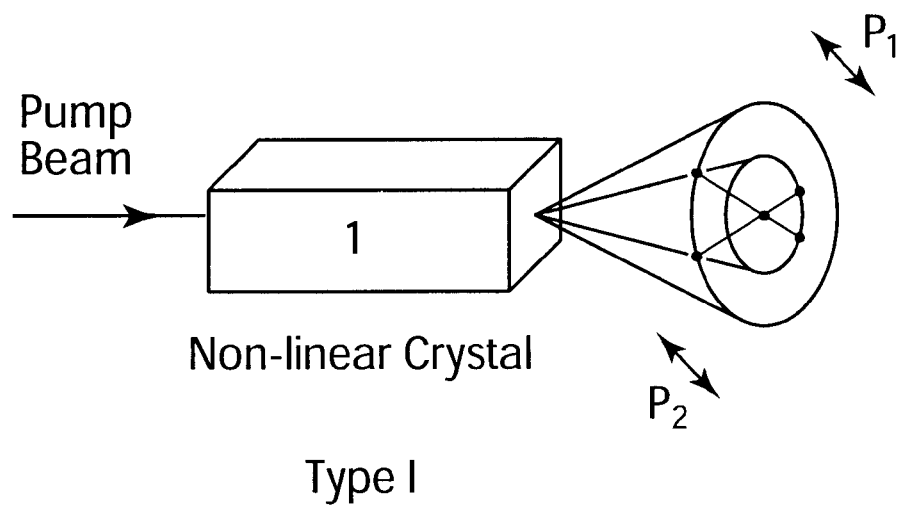
FIG. 1A shows the generating of a photon pair by parametric fluorescence at a non-linear crystal of type I.
Figure 1B:
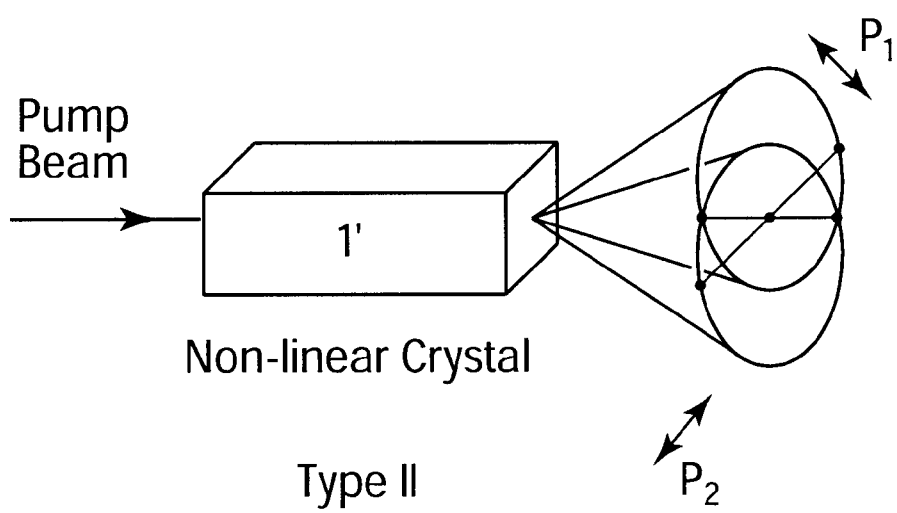
FIG. 1B shows the generating of a photon pair by parametric fluorescence at a non-linear crystal of type II.

FIGS. 1A and 1B show schematically the generating of a quantum-mechanically correlated photon pair by parametric fluorescence. For that purpose, a non-linear crystal 1 of type I or a crystal 1' of type II is pumped with a laser beam of high intensity. In this context, the crystal must be so cut and oriented relative to the excitation beam that the "phase-adaptation conditions" are fulfilled and parametric fluorescence is not already ruled out due to conservation of energy and momentum. When working with non-linear crystals of type I, a pump photon disintegrates with a certain probability into two fluorescence photons having parallel linear polarization $P_1$ and $P_2$, respectively, which are emitted in space directions dependent upon the excitation geometry. Accordingly, when working with non-linear crystals of type II, two photons are generated which are polarized orthogonally relative to each another.

Figure 2:
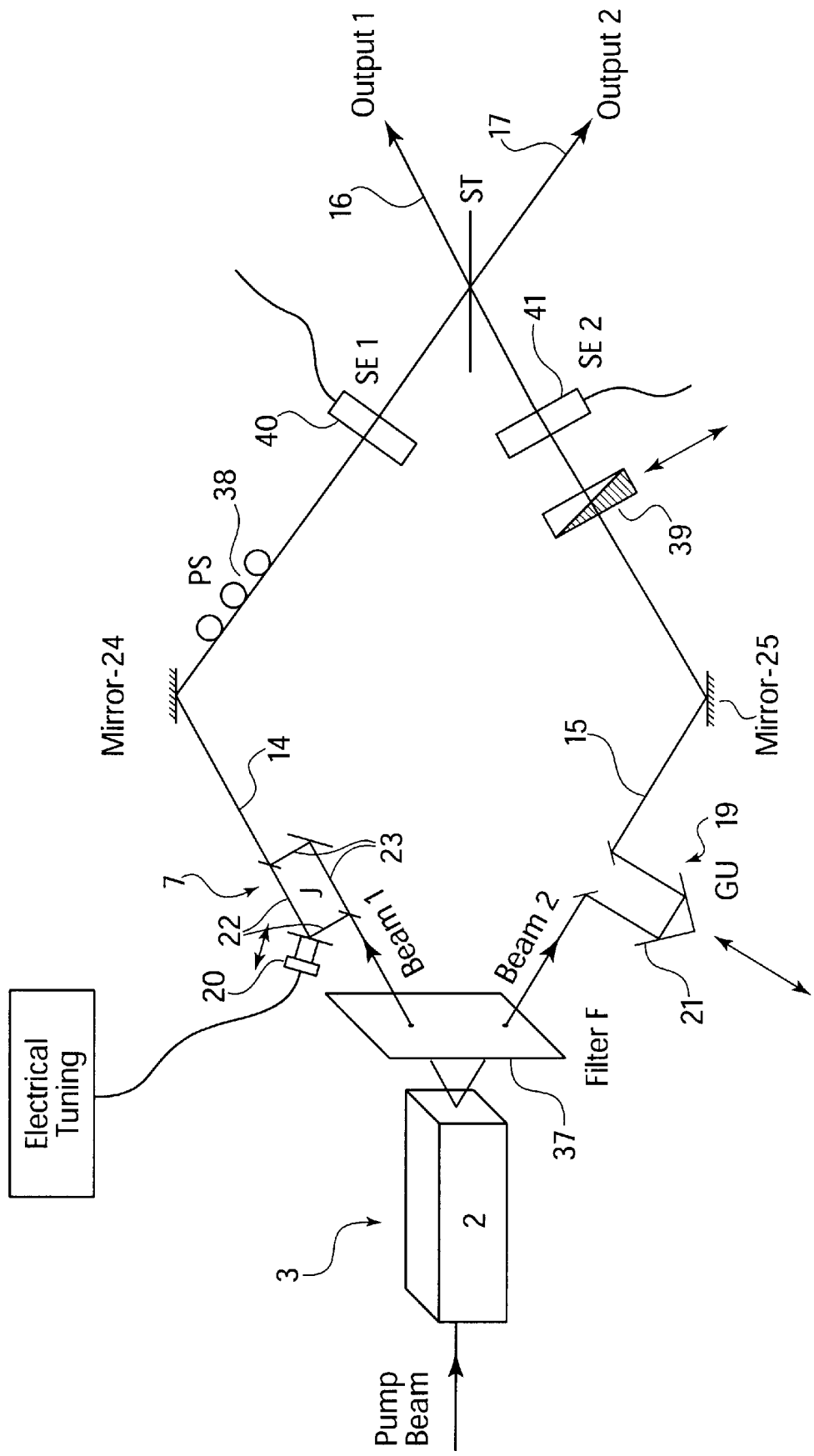
FIG. 2 shows schematically a device of the present invention used as a controllable light source for one-photon or two-photon states.
Figure 3:
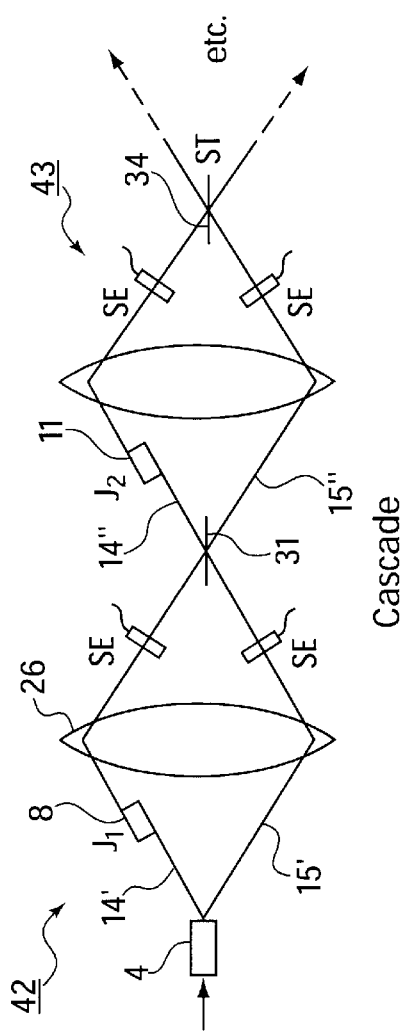
FIG. 3 shows two devices according to the present invention connected in series.
Figure 4:
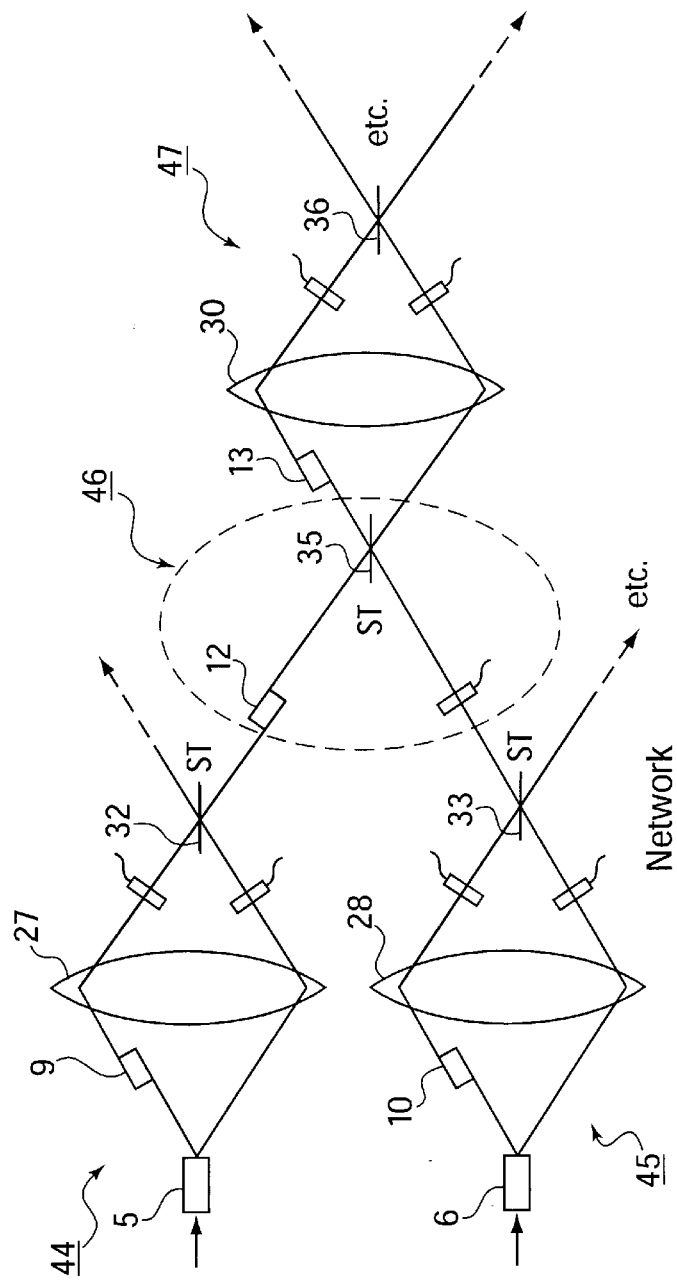
FIG. 4 shows four devices according to the present invention connected to form a network

FIG. 2 shows an arrangement for carrying out the method of the present invention, the arrangement being usable as a controllable light source for one-photon or two-photon states and/or as a controllable separating filter or controllable gate for quantum states, as well as within the framework of an optical computing network according to FIGS. 3 and 4. The device has a light source 3 for quantum-optically correlated photon pairs. This light source is an optically non-linear crystal 2, suitably cut and oriented, which is pumped by a laser beam of high intensity and suitable frequency. By parametric conversion of the pump photons, two fluorescence beams are formed which leave crystal 2 in different directions relative to the propagation direction of the pump beam. In each case, one photon of the one beam is in a quantum-mechanically entangled state with another photon of the other beam.

The pump light is suppressed by a filter 37. This is preferably an optical band-pass filter which is impenetrable for the pump wavelength, but which transmits the fluorescent light of fluorescence wavelengths $\lambda_1$ and $\lambda_2$, respectively. At the output of light source 3, a filter can also be arranged which reduces the intensity of the fluorescent light to the extent that in each case, only one photon pair is found in the arrangement with a certain probability.

The quantum-mechanically correlated fluorescence photons are coupled into one beam-component path 14 and 15 each of the device. By deflection via one or more mirrors 24,25, beam-component paths 14,15 are brought together again at a beam splitter 18. Using beam splitter 18, both beam-component paths 14,15 are superimposed and transferred into two separate output channels 16,17. Instead of using mirrors 24, 25, the two beam-component paths can also be reunited using a lens, as is shown in FIGS. 3 and 4.

According to the present invention, arranged in path 14 of the beam-component paths is an interferometer 7, which in this case is a Mach-Zehnder interferometer having interferometer arms 22 and 23. Interferometer arm 22 has the optical length $\delta 1_F$, which can be varied by an electrically tunable adjustment element 20. Interferometer arm 23 has the fixed length $\delta 1_S$. Thus, optical path-length difference $\delta 1_F - \delta 1_S$ in interferometer 7 can be varied by adjustment element 20.

Located in the other beam-component path 15 according to the present invention is an optical delay section 19, which in this case is an optical "trombone slide". Optical length $\delta 1$ of delay section 19 can be varied by a further adjustment element 21. Like adjustment element 20, it is preferably electrically controllable, which means length $\delta 1$ of delay section 19 can be changed by remote control.

Without taking into consideration the lengths of interferometer arms 22, 23 or of optical delay section 19, the optical lengths of beam-component paths 14, 15 are preferably identical. For the case of a photon pair generated by a non-linear crystal of type I and having identical polarization, the coincidence rate K for coincidences between outputs 16,17 can then be stated as follows:

$$K = \frac{1}{2}\left\{1 - \frac{1}{2}\exp\left[-\frac{1}{c^2 a^2}(\delta 1_F - \delta 1)^2\right] - \frac{1}{2}\exp\left[-\frac{1}{c^2 a^2}(\delta 1_S - \delta 1)^2\right] + \right.$$
$$\cos\left[\frac{\omega_0}{c}(\delta 1_F - \delta 1_S)\right] \cdot \left[\exp\left[-\frac{1}{4c^2 a^2}(\delta 1_F - \delta 1_S)^2\right] - \right.$$
$$\left.\left.\exp\left[-\frac{1}{c^2 a^2}\left(\frac{\delta 1_F + \delta 1_S}{2} - \delta 1\right)^2\right]\right]\right\}$$

$\delta 1_F$, $\delta 1_S$, $\delta 1$, respectively, are the optical paths in interferometer arms 22, 23 and in delay section 19, c is the light speed; and a defines the spectral width of the spectrum of both beams. A Gaussian distribution with the average frequency $\omega_0$ and $\omega_1 + \omega_2 = 2\omega_0$ was assumed for both beams.

In the following, it is assumed that the spectral width of both photons 1/a is so large that path difference $\delta 1_F - \delta 1_S$ of the interferometer surpasses coherence length $c \cdot a$ by several times. It is also assumed that optical path lengths $\delta 1_F$, $\delta 1_S$ are so adjusted to one another, that $\delta 1 = \frac{1}{2}(\delta 1_F - \delta 1_S)$ is valid. Of course, this is equal to the case when the entire optical length of beam-component path 15 including optical delay section 19 conforms with the average optical length of beam-component path 14 including the length of interferometer arms 22, 23.

For this case, coincidence rate K changes into $$K \approx \frac{1}{2}\left\{1 - \cos\left[\frac{\omega_0}{c}(\delta 1_F - \delta 1_S)\right]\right\}$$

Depending upon the path difference, i.e. the phase difference in the interferometer $\delta 1_F - \delta 1_S$, the following cases occur:

a)

$$\cos\left[\frac{\omega_0}{c}(\delta 1_F - \delta 1_S)\right] = +1, \text{ i.e. } \delta 1_F - \delta 1_S = n\frac{2\pi c}{\omega_0} = n\lambda_0,$$

where $n = 0, 1, \ldots$, then $K = 0$.

This means that both photons leave the device together as a pair in one of outputs 16,17. However, it is uncertain which output they take.

b) If $$\cos\left[\frac{\omega_0}{c}(\delta 1_F - \delta 1_S)\right] = -1, \text{ i.e. } \delta 1_F - \delta 1_S = \frac{2n+1}{2}\lambda_0, \text{ then } K = 1.$$

This means that the two photons leave the device via both outputs 16, 17, thus become separated again.

The quantum correlation of the photon pair is retained in both cases. Thus, the device influences the quantum state of the photon pair in a specific manner and is usable as a separating filter or gate in a quantum computer. Prerequisites for this characteristic of the device are the small coherence length of the individual photons from the non-linear crystal, the adjustment of $\delta 1$ to the average path difference of the interferometer, and a coherence length of the pumping laser light which is greater than $\delta 1_F - \delta 1_S$. Since the phase in the interferometer can be adjusted by suitable adjustment elements 20—for example, in microseconds using liquid crystals, and even in nanoseconds using electro-optical crystal modulators—the switchover between the values where K=0 and K=1, or rather the minimum and maximum K attained experimentally—which corresponds to the theoretical cases K=0 and K=1, respectively—is possible very quickly.

If length $\delta 1$ of optical delay section 19 is not to be adjusted to the average path difference of interferometer 7 during each switchover operation, then optical lengths $\delta 1_F$, $\delta 1_S$ of interferometer arms 22, 23 can be increased or decreased individually in each case by a quarter wavelength $\lambda_0$ with the aid of two suitable adjustment elements 20. Thus, the average path difference in interferometer 7 remains constant, while the phase difference changes by $\lambda_0/2$, which corresponds to the switchover from K=0 to K=1 or vice versa.

In a broadening of the present invention, further adjustment elements 38, 39, 40, 41 are mounted in the three beam paths 14, 15. Absorber 39 is used for adjusting the intensity in beam-component path 15; polarization adjustment element 38 is used to adjust the polarization of the photons passing through beam-component path 14 in the event the photons are to be available at the output in a different polarization state than originally generated. The further adjustment elements 40, 41 are used for the purposeful manipulation of the frequency and/or phase of the photons passing through a beam-component path.

The design shown in FIG. 2 can be implemented totally or partially in a construction with optical fibers. The individual components in fiber construction are known. Furthermore, non-linear optical crystal 2 can be replaced by an optically non-linear fiber with suitable fiber coupler. A fiber construction, particularly of beam splitter 18, has the advantage that the photons leaving the device can be directly coupled by splicing or insertion into a further fiber. This also offers the possibility of easily cascading or networking further devices of the type described, as is shown in FIGS. 3 and 4.

In each of the individual stages, the possibility exists of carrying out polarization and phase manipulations at the two-photon state. Individual photons or the photon pair can be influenced as desired. Used for this purpose are electro-optical adjustment elements 40, 41 which are known as delay plates in liquid-crystal construction or as Kerr cells. At this point, it is also possible to implement a defined shift of the spectral frequency of one or both photons with the aid of acousto-optical Bragg cells or with rotating $\lambda/2$-plates, i.e., their electro-optical equivalents, as well as to store the photons optically, for example, in glass-fiber loops or resonators.

If the interferometer in one of beam-component paths 14, 15 is constructed as a polarizing interferometer, such as a quartz plate, then the phase shift, i.e. the path difference in interferometer 7 can also be adjusted outside of interferometer 7 with the aid of Pancharatnams phase, such as by introducing a further polarizer into the beam path.

It is also possible to adjust the device specifically to the case K=0, i.e., one photon pair in one of outputs 16, 17, to thus produce a defined state in the optical output channel. For this case, after a one-time line-up of the device, it is possible to dispense with the variable path lengths, thus to dispense with the adjustment elements.

FIG. 3 shows two series-connected devices 42, 43. First device 42 is composed of a light source 4 for photon pairs which is a non-linear optical crystal having suitable excitation. Light source 4 generates a photon pair, the individual photons being coupled into one beam-component path 14', 15', each, of first device 42. An interferometer 8 and an adjustment element SE are located in beam-component path 14'0. A further adjustment element SE is located in second beam-component path 15'. Both beam components are united at abeam splitter 31 by a lens 26. First device 42 is lined up in the manner described above, a switchover between the cases where K=0 and K=1, respectively, being possible by changing the path difference in interferometer 8 and/or by driving adjustment elements SE.

At this point, a second device 43 of the same kind is arranged downstream of first device 42. In this context, device 42 serves as the light source for device 43, in that output channels 14" and 15", respectively, represent the input channels of second device 43, thus they change directly into beam-component paths 14", 15" of second device 43.

According to the present invention, device 43 also has an interferometer 11 in beam-component path 15". In addition, adjustment elements SE are arranged in both beam-component paths 14", 15". Both beam-component paths are reunited by a lens 29 onto a further beam splitter 34. The cascade can be continued as desired by the series-connection of further devices.

FIG. 4 shows four interconnected devices 44, 45, 46, 47 of the present invention, devices 44 and 45 being parallel-connected, device 46 being composed of one output channel each of devices 44 and 45 which are reunited at a beam splitter 35, and device 47 being connected in series to device 46. Devices 44 and 45 have a non-linear crystal as light source 5, 6, the light source of device 46 being composed of one output channel each of elements 44, 45, element 46 on its part representing the light source of downstream element 47. The beam-component paths of the individual elements are either conducted through lenses 27, 28, 30 to corresponding beam splitters 32, 33 and 36, respectively, in the case of element 46, the beam-component paths are reunited on beam splitter 35 solely due to the geometric arrangement. Also assigned to each of the devices is an interferometer 9, 10, 12, 13 in one of the beam-component paths, as well as an adjustment element in the other respective beam-component path, at any rate, in both beam-component paths, as well.

The path of one or more photon pairs or of the individual photons in such a network can be predetermined within certain limits by suitable adjustment of the phase differences in the interferometers and/or of the adjustment elements. Thus, the cascading or interconnection, and the specific intervention in the quantum state of the photon pair(s) provide the basic elements of a quantum-optical computing machine.

The invention is industrially applicable as a basic element of a quantum computer and for cryptography methods in many sectors of information technology.

List of Reference Numerals:

| | |
|---|---|
| 1, 1', 2 | non-linear crystal |
| 3, 4, 5, 6 | light source |
| 7–13 | interferometer |
| 14, 15, 14', 14" | |
| 15', 15" | beam-component path (optical channel) |
| 16, 17 | output channel |
| 18, 31–36 | beam splitter |
| 19 | optical delay section (optical trombone path) |
| 20, 21, SE | adjustment element |
| 22, 23 | interferometer arm |
| 24, 25 | mirror |
| 26–30 | lens |
| 37 | filter |
| 38 | polarization adjustment element |
| 39 | absorber |
| 40, 41 | phase- and/or frequency-altering adjustment element |
| 42–47 | device (optical separating filter/gate) |

What is claimed is:

1. A method for generating a choice of one of individual photons and photon pairs in at least one of a first optical channel and a second optical channel, comprising the steps of:

generating a two-photon state corresponding to a photon pair;

spatially separating the photon pair while preserving a quantum-mechanical correlation if photons of the photon pair are emitted in a collinear manner;

coupling one of the photons of the photon pair into one of the first optical channel and the second optical channel and another one of the photons of the photon pair into another one of the first optical channel and the second optical channel, wherein one of the first optical channel and the second optical channel includes an interferometer providing a variable optical path-length difference $\delta 1_F - \delta 1_S$, and the other one of the first optical channel and the second optical channel includes an optical delay section having an optical length $\delta 1$;

spatially reuniting both the first optical channel and the second optical channel through a beam splitter; and adjusting quantities $\delta 1_F$, $\delta 1_S$, and $\delta 1$ such that a probability K for coincidences between outputs of the beam splitter is a choice corresponding to one of K=0, approximately K=1, and K corresponding approximately to a predetermined intermediate value, wherein K=0 corresponds to the photon pair being present in one of the outputs of the beam splitter, and K=1 corresponds to one of the photons of the photon pair being present in one of the outputs of the beam splitter and another one of the photons of the photon pair being present in another one of the outputs of the beam splitter.

2. The method according to claim 1, wherein:

the two-photon state corresponding to the photon pair is generated by a parametric fluorescence by pumping an optically non-linear crystal with a pumping laser light having a frequency of $2\omega_0$.

3. The method according to claim 2, wherein:

the pumping laser light includes a coherence length that is greater than the path-length difference $\delta 1_F - \delta 1_S$ in the interferometer.

4. The method according to claim 1, further comprising the step of:

setting the path-length difference $\delta 1_F - \delta 1_S$ in the interferometer to approximately an integral multiple of a half average wavelength $\lambda_0$ of the photons of the photon pair to produce a relationship corresponding to $|\delta 1_F - \delta 1_S| = n/2\lambda_0$, wherein:

n=0, 1, 2 . . . , $\delta 1$ is adjusted to an average path difference $\frac{1}{2}(\delta 1_F + \delta 1_S)$ of the interferometer to produce a relationship corresponding to $\delta 1 \approx \frac{1}{2}(\delta 1_F + \delta 1_S)$, and a transition from n to n±1 corresponds to a transition from one of K≈0 to K≈1 and K≈1 to K≈0.

5. The method according to claim 1, further comprising the step of:

determining the probability K as a function of at least one of quantities $\delta 1_F$, $\delta 1_S$, and $\delta 1$, the step of determining the probability K being performed by mounting a plurality of detectors at the outputs of the beam splitter and measuring a coincidence rate according to an experimental technique, wherein settings for $\delta 1_F$, $\delta 1_S$, and $\delta 1$ resulting in at least one of K≈0, K≈1, and K corresponding to the predetermined intermediate value are recorded.

6. The method according to claim 5, further comprising the step of:

making a switchover among occurrences of K≈0, K≈1, and K corresponding to the predetermined intermediate value by performing a remote-controlled change of at least one of the quantities $\delta 1_F$, $\delta 1_S$, and $\delta 1$.

7. A device, comprising:

a light source for a quantum-optically correlated photon pair;

an arrangement for separating the photon pair if photons of the photon pair are emitted in a collinear manner;

a plurality of beam-component paths arranged such that each one of the photons is coupled into a corresponding one of the plurality of beam-component paths;

a beam splitter;

an arrangement for reuniting the plurality of beam-component paths at the beam splitter to superimpose and transfer the plurality of beam components into a plurality of shared output channels;

an interferometer arranged in one of the plurality of beam-component paths and including a first interferometer arm corresponding to optical path length $\delta 1_F$ and a second interferometer arm corresponding to optical path length $\delta 1_S$;

an optical delay section corresponding to optical length $\delta 1$ and arranged in another one of the plurality of beam-component paths; and an arrangement for changing at least one of optical path lengths $\delta 1_F$, $\delta 1_S$, and $\delta 1$.

8. The device according to claim 7, wherein the device is configured as at least one of a controllable light source for one of a one-photon state and a two-photon state, and as one of a controllable separating filter and a controllable gate for quantum states.

9. The device according to claim 7, wherein:

the light source includes:

an optically non-linear crystal, a pumping light source producing a pump light, and an optical filter for suppressing the pump light at an output of the optically non-linear crystal, and the photon pair is generated in the optically non-linear crystal by a parametric conversion of one photon of the pump light.

10. The device according to claim 9, wherein:

the pumping light source corresponds to a laser.

11. The device according to claim 7, further comprising:

an optically linear fiber, wherein:

the light source includes:

an optically non-linear fiber corresponding to a non-linear fiber piece arranged by being one of inserted into and added onto the optically linear fiber, a pumping light source producing a pump light, and an optical filter for suppressing the pump light at an output of at least one of the optically non-linear fiber and the optically linear fiber, and the photon pair is generated in at least one of the optically non-linear fiber and the optically linear fiber by a parametric fluorescence.

12. The device according to claim 11, wherein:

the pumping light source corresponds to a laser.

13. The device according to claim 7, wherein:

the light source is formed by one of one output of at least a further device and by a combination of a plurality of outputs of a plurality of further devices.

14. The device according to claim 7, wherein:

the arrangement for separating the photon pair includes one of a wavelength-selective mirror, a polarizer, and a polarizing beam splitter.

15. The device according to claim 7, wherein:

at least one of the optical path lengths $\delta 1_F$, $\delta 1_S$, and $\delta 1$ is capable of being varied by at least one of at least one mechanical adjustment element and at least one electro-optical adjustment element.

16. The device according to claim 15, wherein:

each one of the at least one mechanical adjustment element and the at least one electro-optical adjustment element is remote-controlled.

17. The device according to 15, claim wherein:

each one of the at least one mechanical adjustment element and the at least one electrooptical adjustment element includes one of electronically controllable liquid-crystal cells and electro-optical crystal modulators.

18. The device according to claim 7, wherein:

the interferometer includes one of a Mach-Zehnder interferometer, a Michelson interferometer, a Fabry-Perot interferometer, and an Echelon.

19. The device according to claim 7, wherein:

the interferometer includes a linearly birefringent crystal having an optical path difference $\delta 1_F - \delta 1_S$ that is enlarged by one of an additional compensator and an electrically tunable delay plate corresponding to one of a liquid-crystal cell and a Kerr cell, such that the optical path difference $\delta 1_F - \delta 1_S$ is variable by more than one half wavelength of the photon coupled into a corresponding one of the plurality of beam-component paths.

20. The device according to claim 19, wherein:

the linearly birefringent crystal includes a quartz plate, and the additional compensator includes a Babinet-Soleil compensator.

21. The device according to claim 7, wherein:

the beam splitter includes an optical fiber coupler having a division ratio of 1:1.

22. The device according to claim 7, wherein mounted in at least one of the plurality of beam-component paths are at least one of:

at least one intensity-altering absorber for influencing a quantity of the photons, at least one polarization-altering adjustment element for influencing a polarization of the photons, at least one phase-altering adjustment element for influencing a phase of the photons, and at least one frequency-altering adjustment element for influencing a frequency of the photons.

23. The device according to claim 7, further comprising:

at least one optical storage device inserted into at least one of the plurality of beam-component paths.

24. The device according to claim 23, wherein the at least one optical storage device includes one of a glass-fiber loop and a Fabry-Perot resonator.

* * * * *